United States Patent
Janssen

(10) Patent No.: US 7,605,773 B2
(45) Date of Patent: Oct. 20, 2009

(54) HEAD-UP DISPLAY SYSTEM AND METHOD FOR CARRYING OUT THE LOCATION-CORRECT DISPLAY OF AN OBJECT SITUATED OUTSIDE A VEHICLE WITH REGARD TO THE POSITION OF THE DRIVER

(75) Inventor: Holger Janssen, Oldendorf (DE)

(73) Assignee: Robert Bosch GmbH, Stuttgart (DE)

( * ) Notice: Subject to any disclaimer, the term of this patent is extended or adjusted under 35 U.S.C. 154(b) by 723 days.

(21) Appl. No.: 10/481,912

(22) PCT Filed: May 4, 2002

(86) PCT No.: PCT/DE02/01619

§ 371 (c)(1),
(2), (4) Date: May 3, 2004

(87) PCT Pub. No.: WO03/005102

PCT Pub. Date: Jan. 16, 2003

(65) Prior Publication Data

US 2004/0178894 A1    Sep. 16, 2004

(30) Foreign Application Priority Data

Jun. 30, 2001    (DE) ............................... 101 31 720

(51) Int. Cl.
*G09G 5/00*    (2006.01)

(52) U.S. Cl. .................. 345/7; 345/8; 345/156; 345/619; 345/633

(58) Field of Classification Search ............... 345/156, 345/633, 7, 8, 173, 619; 340/435, 557, 425.5, 340/461, 988, 436, 903, 973, 980, 572.1, 340/936, 433; 701/96, 301, 120, 200, 207; 348/148; 342/70; 455/456.1; 359/13, 630, 359/708

See application file for complete search history.

(56) References Cited

U.S. PATENT DOCUMENTS

| 3,737,902 | A | | 6/1973 | O'Hagan et al. |
|---|---|---|---|---|
| 4,104,612 | A | * | 8/1978 | Lowe .......................... 340/973 |
| 4,554,545 | A | * | 11/1985 | Lowe .......................... 340/980 |
| 4,698,489 | A | * | 10/1987 | Hickin et al. ............... 235/407 |
| 4,775,218 | A | | 10/1988 | Wood et al. |
| 4,847,603 | A | * | 7/1989 | Blanchard ...................... 345/7 |
| 4,908,611 | A | | 3/1990 | Iino et al. |
| 5,315,295 | A | * | 5/1994 | Fujii .......................... 340/936 |
| 5,414,439 | A | * | 5/1995 | Groves et al. .................. 345/7 |
| 5,519,536 | A | | 5/1996 | Hoehn |
| 5,572,203 | A | | 11/1996 | Golia et al. |
| 5,719,567 | A | | 2/1998 | Norris |
| 5,801,667 | A | | 9/1998 | Shimizu et al. |
| 5,969,969 | A | | 10/1999 | Ejiri et al. |
| 6,161,062 | A | | 12/2000 | Sicre et al. |
| 6,173,220 | B1 | * | 1/2001 | Schmitt .......................... 701/4 |
| 6,226,389 | B1 | * | 5/2001 | Lemelson et al. ........... 382/104 |
| 6,275,231 | B1 | * | 8/2001 | Obradovich ................. 345/156 |
| 6,348,877 | B1 | * | 2/2002 | Berstis et al. ............... 340/980 |
| 6,405,132 | B1 | * | 6/2002 | Breed et al. ................. 701/301 |

(Continued)

FOREIGN PATENT DOCUMENTS

| DE | 40 32 927 | 4/1992 |
|---|---|---|
| EP | 1 035 455 | 9/2000 |
| JP | 07 257228 | 10/1995 |
| WO | WO 01 29640 | 4/2001 |
| WO | WO 01 45080 | 6/2001 |

*Primary Examiner*—Prabodh M Dharia
(74) *Attorney, Agent, or Firm*—Kenyon & Kenyon LLP

(57) ABSTRACT

A head-up display system for representing an object of a space external to the vehicle, having a device for recording a position of a passenger of the vehicle and a device for the correct-location representation of the object with respect to the position of the driver. The head-up display system may be applied to navigation systems and to automatic cruise control systems.

39 Claims, 8 Drawing Sheets

U.S. PATENT DOCUMENTS

| | | | |
|---|---|---|---|
| 6,405,975 B1 * | 6/2002 | Sankrithi et al. | 244/1 R |
| 6,553,130 B1 * | 4/2003 | Lemelson et al. | 382/104 |
| 6,571,166 B1 * | 5/2003 | Johnson et al. | 701/120 |
| 6,600,418 B2 * | 7/2003 | Francis et al. | 340/572.1 |
| 6,674,445 B1 * | 1/2004 | Chithambaram et al. | 345/619 |
| 6,703,944 B1 * | 3/2004 | Obradovich | 340/903 |
| 6,727,807 B2 * | 4/2004 | Trajkovic et al. | 340/436 |
| 6,862,519 B2 * | 3/2005 | Walter | 701/120 |
| 6,926,429 B2 * | 8/2005 | Barlow et al. | 362/464 |
| 6,956,503 B2 * | 10/2005 | Yokokohji et al. | 340/988 |
| 6,975,932 B2 * | 12/2005 | Obradovich | 701/96 |
| 6,977,630 B1 * | 12/2005 | Donath et al. | 345/7 |
| 7,068,444 B2 * | 6/2006 | Nishi | 359/708 |
| 7,072,764 B2 * | 7/2006 | Donath et al. | 701/200 |
| 7,126,583 B1 * | 10/2006 | Breed | 345/158 |
| 7,195,381 B2 * | 3/2007 | Lynam et al. | 362/494 |
| 7,202,776 B2 * | 4/2007 | Breed | 340/435 |
| 7,330,784 B2 * | 2/2008 | Johnson et al. | 701/45 |
| 7,382,274 B1 * | 6/2008 | Kermani et al. | 340/901 |
| 7,552,008 B2 * | 6/2009 | Newstrom et al. | 701/207 |
| 2001/0032880 A1 * | 10/2001 | Levine | 235/384 |
| 2002/0070862 A1 * | 6/2002 | Francis et al. | 340/572.1 |
| 2002/0099528 A1 * | 7/2002 | Hett | 703/13 |
| 2002/0154349 A1 * | 10/2002 | Halldorsson et al. | 359/15 |
| 2003/0085867 A1 * | 5/2003 | Grabert | 345/156 |
| 2003/0142041 A1 * | 7/2003 | Barlow et al. | 345/8 |
| 2004/0018845 A1 * | 1/2004 | Kroll | 455/456.1 |
| 2004/0119633 A1 * | 6/2004 | Oswald et al. | 342/70 |
| 2005/0134440 A1 * | 6/2005 | Breed | 340/435 |
| 2005/0149251 A1 * | 7/2005 | Donath et al. | 701/200 |
| 2006/0125918 A1 * | 6/2006 | Sutton | 348/148 |

* cited by examiner

HEAD-UP DISPLAY SYSTEM AND METHOD FOR CARRYING OUT THE LOCATION-CORRECT DISPLAY OF AN OBJECT SITUATED OUTSIDE A VEHICLE WITH REGARD TO THE POSITION OF THE DRIVER

FIELD OF THE INVENTION

The present invention relates to a head-up display system, especially for use in a navigation system and a system for automatic cruise control, as well as a corresponding method and a computer program product.

BACKGROUND INFORMATION

So-called head-up display systems are available for use in military fighter planes. U.S. Pat. No. 6,161,062, for example, relates to a display system for the pilot of a plane, using a head-up display. Via the head-up display, for instance, an artificial horizon is blended in for the pilot, as well as flight data, such as ones concerning flight altitude and speed, which are recorded by sensors.

U.S. Pat. No. 4,775,218 and U.S. Pat. No. 5,572,203 relate to the problem of the correct superimposition of symbols to be projected in a military plane. To solve this problem, among other things, optical systems are proposed, having a laser beam for the appropriate correction of the representation.

In vehicles, such as motor vehicles, on the other hand, the representation of information for the driver is generally performed via the dashboard and via the display of a navigation system. It may be a disadvantage, in this regard, that the driver has briefly to divert his glance from the road, in order to absorb the corresponding information.

U.S. Pat. No. 5,519,536 relates to a warning system for the display of information on a head-up display in a vehicle. Such a warning is displayed, for example, when a minimum distance from a preceding vehicle is undershot, the size of the displayed warning indication increasing as the distance decreases.

The system for driver assistance of U.S. Pat. No. 5,969,969 detects objects in the surroundings of the vehicle, and generates from that appropriate information for the driver. This information can be displayed on a head-up display.

Various head-up display systems are also in U.S. Pat. No. 5,719,567 and U.S. Pat. No. 5,801,667.

SUMMARY OF THE INVENTION

The exemplary embodiment of the present invention is based on creating an improved head-up display for a vehicle, such as an improved navigation system and a system for automatic cruise control, as well as a corresponding method and computer program product.

The exemplary embodiment of the present invention permits showing objects in the space external to the vehicle to one or more passengers of a vehicle, such as to the driver and/or the front seat passenger, in such a way that the objects are perceived at the correct position, that is, the respective passenger of the vehicle looks at the space external to the vehicle through the head-up display as he would through a pair of glasses. The correct superimposition of the projected objects onto the actual space external to the vehicle is denoted from here on as correct-location representation.

The exemplary embodiment of the present invention makes the correct-location representation possible by detecting the position of the respective passenger. In this context, the position of the head may be advantageously recorded. Particularly good results may be obtained if the position of the eyes and the viewing direction of the eyes are recorded.

If, for example, the driver moves his head by turning or by an inclining motion, or the viewing direction of the driver changes, this may be recorded by appropriate sensors inside the vehicle, and the representation on the head-up display may be correspondingly adjusted.

Therefore, the exemplary embodiment of the present invention allows, for example, aligning the virtual representation shown on the head-up display with the actual road traffic scene. Thus the projection of the head-up display and the real scene viewed fit with each another, so that the driver is given optimum support.

This is may be of great importance in critical driving situations. For instance, a wild animal may be detected in the dark by sensors for recording the space external to the vehicle, such as by an infrared sensor. A symbol representing the wild animal is then shown in correct-location fashion on the head-up display, so that the driver can immediately react to this, without first having to interpret other display units for this. Because of that it may be ensured that no valuable time is lost for a quick reaction.

A special advantage of the exemplary embodiment of the present invention may be seen in that, because of the correct-location representation as a function of the position of the respective passenger, a direct connection between the actual world external to the vehicle and a superimposed virtual representation may be established.

In an exemplary embodiment of the present invention, information may also be given over the head-up display which, is immediately recognizable by the driver, but may possibly have been overlooked. For example, warning signs, speed limits or other traffic information may be projected onto the head-up display as additional information. Such information, warnings and indications of endangerment may also be passed on to the driver, besides the display in the head-up display, as additional optical, acoustical or haptic messages—for instance, via a vibrating steering wheel.

According to another exemplary embodiment of the present invention, even the curvature of the windshield may be taken into consideration when calculating the correct-location image projection data.

In addition, an exemplary embodiment of the present invention may permit the implementation of various security functions.

Traffic signs, such as speed limits to which the driver has not yet reacted by adjusting his speed, may be marked on the head-up display in correct-location manner.

The position of the roadway may also be advantageously displayed on the head-up display using corresponding markings. In response to a threat of leaving the roadway, additional warning information can be displayed.

Additional information for assisting the driver may also be faded in, such as fading in help during lane change or while pulling into turn-off lanes (e.g. before traffic lights or on expressway exits). Warnings of sharp curves may efficiently be faded into the correct-location head-up display. In this context, additional information, such as the distance to the right roadway edge, may be visualized in a suitable way on the head-up display.

The fading in of obstacles that are invisible to the driver, such as the display of wild animals in the dark, which are at the edge of the roadway or are running across the roadway, may be rapidly interpreted by the driver, on account of the correct-location fading in. For the detection of such invisible obstacles, night vision sensors may even be used, such as infrared cameras.

Furthermore, the system according to an exemplary embodiment of the present invention may give out additional warning hints and information to the driver via the head-up display. If, for example, a collision with another object is threatening, such as with a pedestrian, a child, another traffic participant, or animals, the system may be able to specially mark and/or highlight the corresponding endangered objects in the display.

In addition, a possible evasive maneuver or several alternative evasive maneuvers may be calculated automatically and faded into the head-up display. In this way, the driver's attention is drawn to the dangerous situation, and he may select the evasive maneuver by confirming it, and this may then be carried out automatically by the vehicle.

In case several evasive maneuvers are available for selection, the driver may decide among these. The advantage of the use of a head-up display having correct-location display in this situation is, in particular, that the driver may immediately interpret the information content of the display, and may select critical evasive maneuvers at his own responsibility. The responsibility remains with the driver, as before, but he may be supported by a collision-avoidance assistant to a maximum extent, with respect to a difficult evasive maneuver.

An exemplary embodiment of the present invention may also be suitable for implementing various convenience functions, of which some are mentioned as examples below.

In one exemplary embodiment of the present invention, navigation data are faded directly into the head-up display, along with information that fits the current road scene. This may have the advantage that the navigation data are immediately understood by the driver, without the necessity of interpreting a pictogram or the like.

For example, the street onto which one is to turn, may be directly marked in the head-up display in correct-location fashion, so that the driver is guided directly, without having to transfer the indication on a separate navigation display to the current driving situation. In this context, an additional advantage is that one may use such a navigation system without the settling-in time that would otherwise be required.

Another exemplary embodiment of the present invention relates to the automatic cruise control. In this context, a preceding vehicle may be shown on the head-up display in correct location. This vehicle may be selected as a reference object for the automatic cruise control, as a so-called "real target", and may be marked correspondingly highlighted in the head-up display.

In another exemplary embodiment of the present invention, for example, in a traffic jam, films or the like may be faded in over the head-up display. Alternatively, information services or, for example, the Internet may be used. In such cases, the display may be divided for the driver and for a passenger, so that both have their "own" screen.

DETAILED DESCRIPTION

Figure 1:
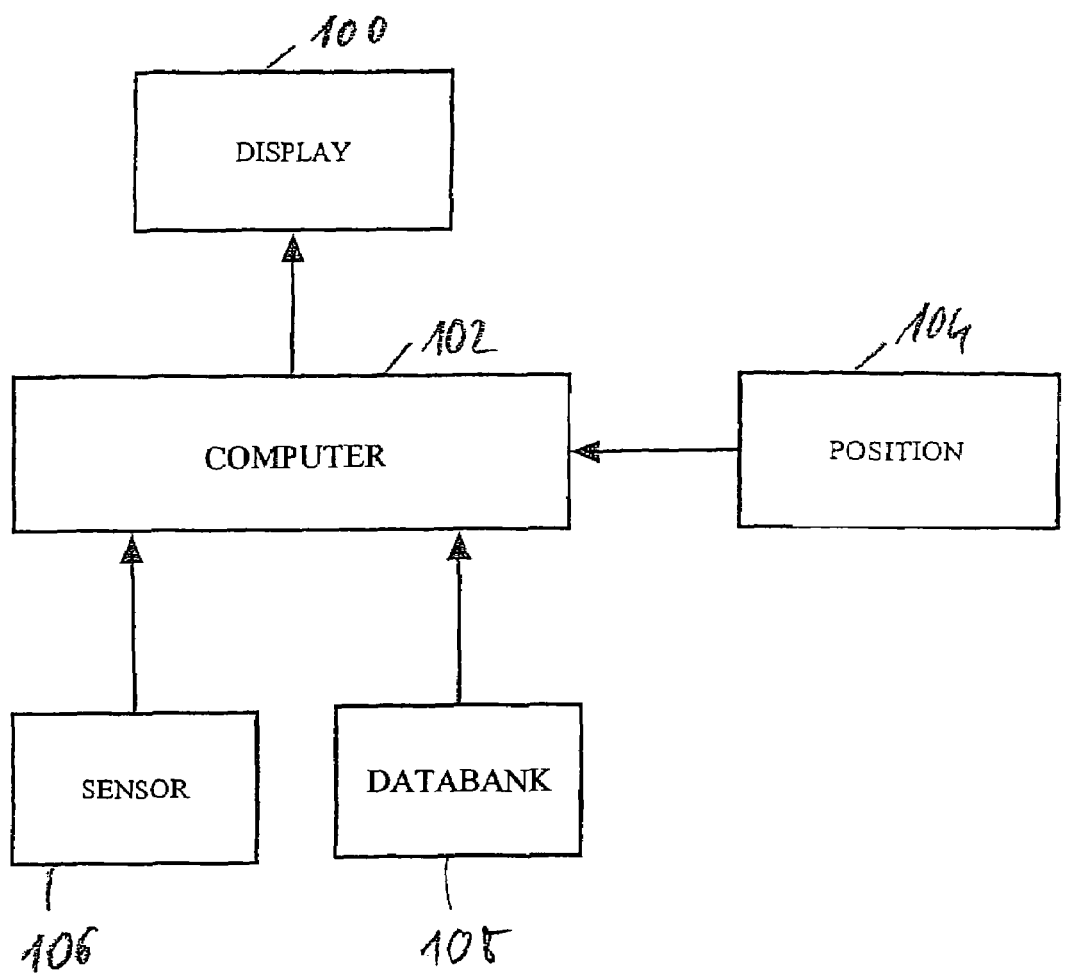
FIG. 1 shows a block diagram of an exemplary embodiment of a head-up display system according to the present invention.

FIG. 1 shows an exemplary embodiment of a head-up display system having a head-up display 100. Head-up display 100 is controlled by a computer 102. The image data of the object to be shown on head-up display 100 are also generated by computer 102.

Computer 102 is connected to a passenger compartment sensing system 104. Passenger compartment sensing system 104 includes at least one sensor for recording the position of at least one passenger of the vehicle. For example, at least one position of the driver and/or the front-seat passenger may be recorded. It may be advantageous in each case to record of each respective head position and/or the position of the eyes and the viewing direction as well.

Computer 102 also receives data from at least one recording sensor 106 for recording an object in a space external to the vehicle. In the case of the object, any relevant traffic information may be involved, such as another traffic participant, a pedestrian, a child, a cyclist or an animal on the roadway, traffic signs, roadway markings and the like.

Also, computer 102 is connected to a databank 108. Databank 108 may, for example, include navigational data. In that case, computer 102 may generate image data from the navigational data, for the correct-location display in head-up display 100, in order to indicate the travel direction, for example, to the driver. Computer 102, for instance, may fade in on head-up display 100, superimposed in correct location on the road, a marking for a road into which the driver is to turn off.

Furthermore, databank 108 may also include video data, such as movies stored on DVD or the like. Those video data may also be displayed on display 100 via computer 102.

In the calculation of the image data for display on head-up display 100, computer 102 takes into account the position of the vehicle's passengers supplied by passenger compartment sensing system 104, so that the display on head-up display 100 takes place in correct-location fashion. In this context, computer 102 in each case may adjust the calculation of the image data to be displayed to the current position supplied by passenger compartment sensing system 104.

For example, when passenger compartment sensing system 104 records the head position of the driver, the latter receives a correct-location representation of the respective traffic information on head-up display 100, even if he changes the position of his head.

Figure 2:
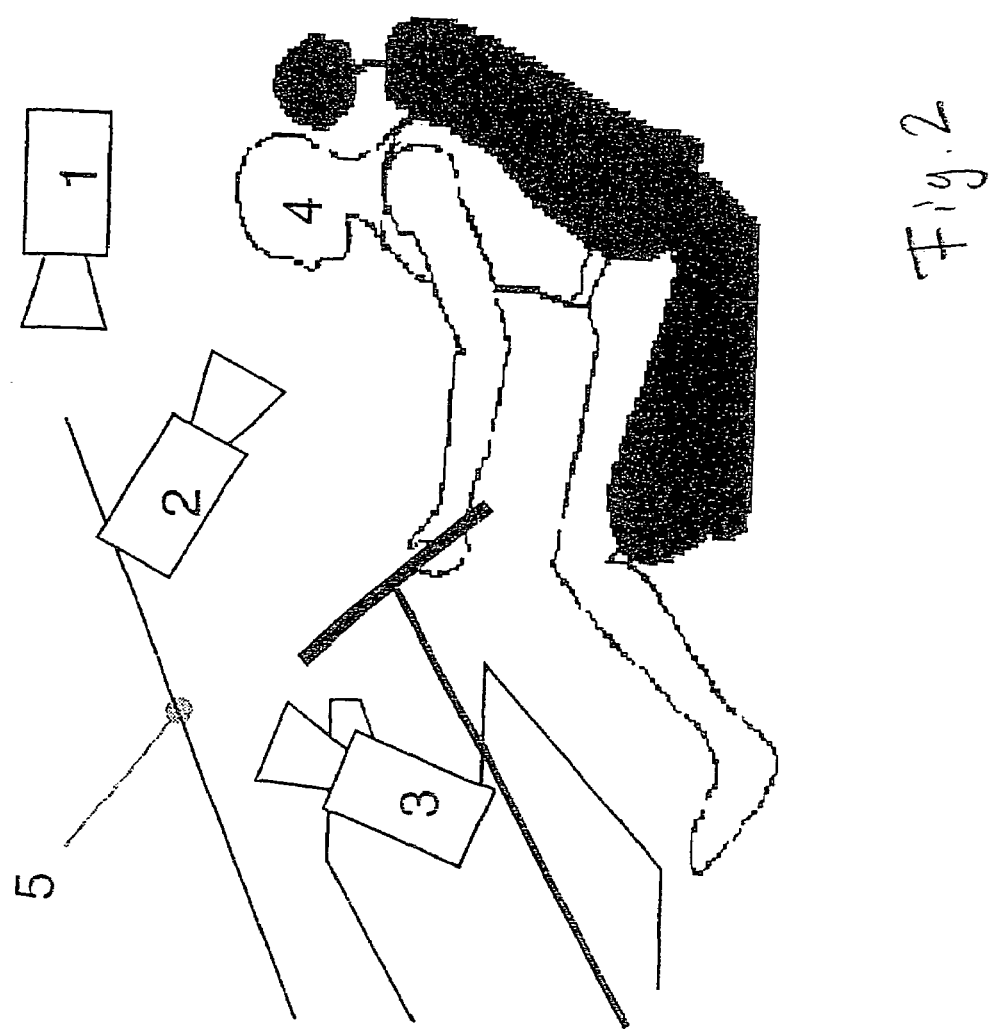
FIG. 2 shows a lateral partial representation of a vehicle having a head-up display system.

FIG. 2 shows the side view of a driver in a vehicle. The road scene in front of the vehicle is recorded by one or more recording sensors 1. These are used for recording the space external to the vehicle. In the case of a recording sensor 1, a camera system may be involved, for example, having one or more cameras, one or more range sensors or one or more radar systems. In the example being viewed here, the recording sensor is positioned behind windshield 5. However, this is not mandatory; the recording sensor(s) may also be situated at any other place of the vehicle.

The position of the driver, and, for example, his head position 4, is recorded by a system 2, which is directed into the passenger compartment of the vehicle. This system 2, also may be implemented, for example, by video range or radar sensors.

On windshield 5, on account of projection unit 3, there is a head-up display in the viewing range of the driver. Projection unit 3 is controlled by a computer (cf. computer 102 in FIG. 1) which is connected to recording sensors 1 and system 2, so as to project, for example, objects detected by recording sensors 1 in the space external to the vehicle in correct-location fashion onto windshield 5, and, appropriately to head position 4.

The image data generated by the computer may be thus superimposed by correct-location projections onto the current road scene on windshield 5 in such a way that an intuitive interpretation of the data made available by the computer may be made by the driver.

Figure 3:
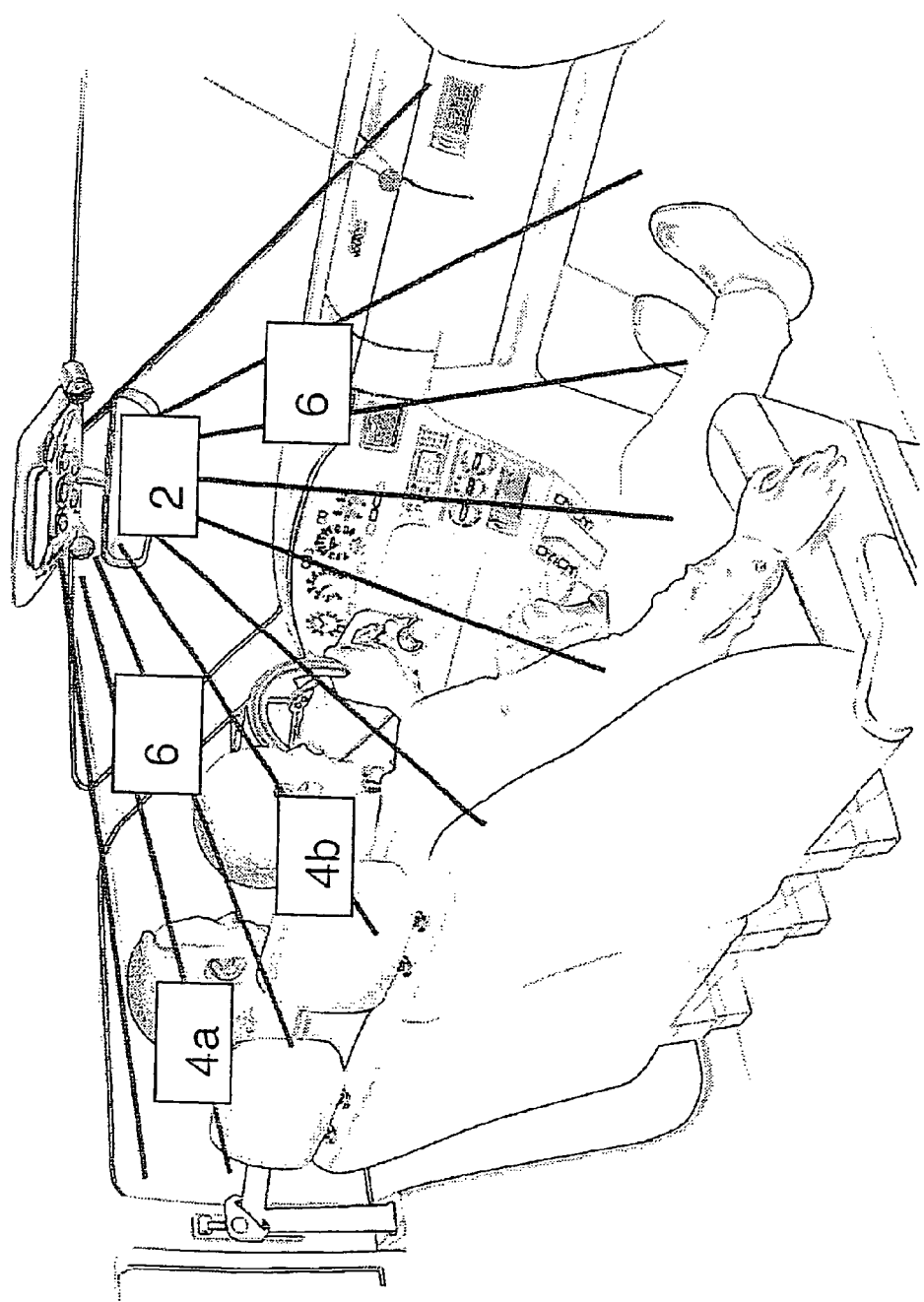
FIG. 3 shows the passenger compartment of a vehicle having a head-up display system.

FIG. 3 shows an exemplary embodiment of the passenger compartment of a vehicle using a recording range 6 of system 2. Recording range 6 is that range within which system 2 is able to ascertain, for example, a position of the driver and/or the front-seat passenger, as well as their corresponding head positions. In the example of FIG. 3, system 2 ascertains, in recording range 6, head positions 4a and 4b of the driver and front-seat passenger, respectively, in the passenger compartment of the vehicle.

Figure 4:
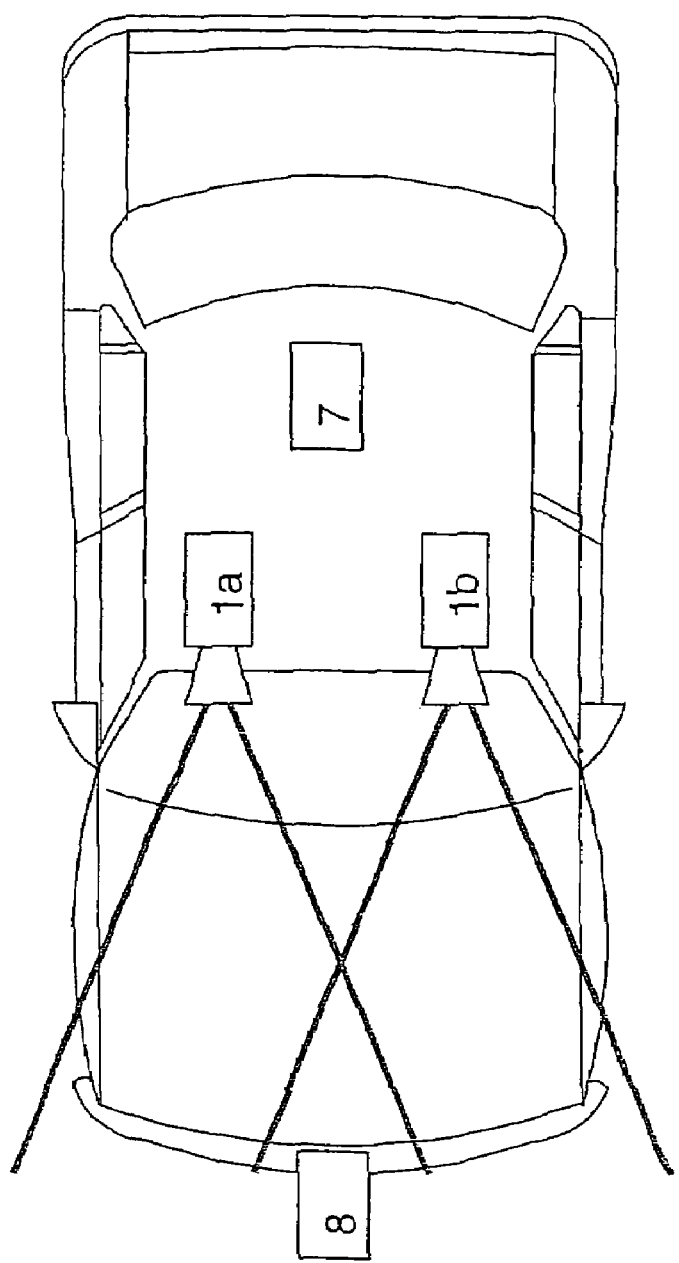
FIG. 4 shows an exemplary arrangement of sensors for recording the space external to the vehicle.

FIG. 4 shows a vehicle 7. In a region behind the windshield of vehicle 7 there is a pair of recording sensors 1a and 1b. These have a recording range 8 in the space external to the vehicle. Recording sensors 1a and 1b may be designed as stereo sensors for generating three-dimensional image data.

Figure 5:
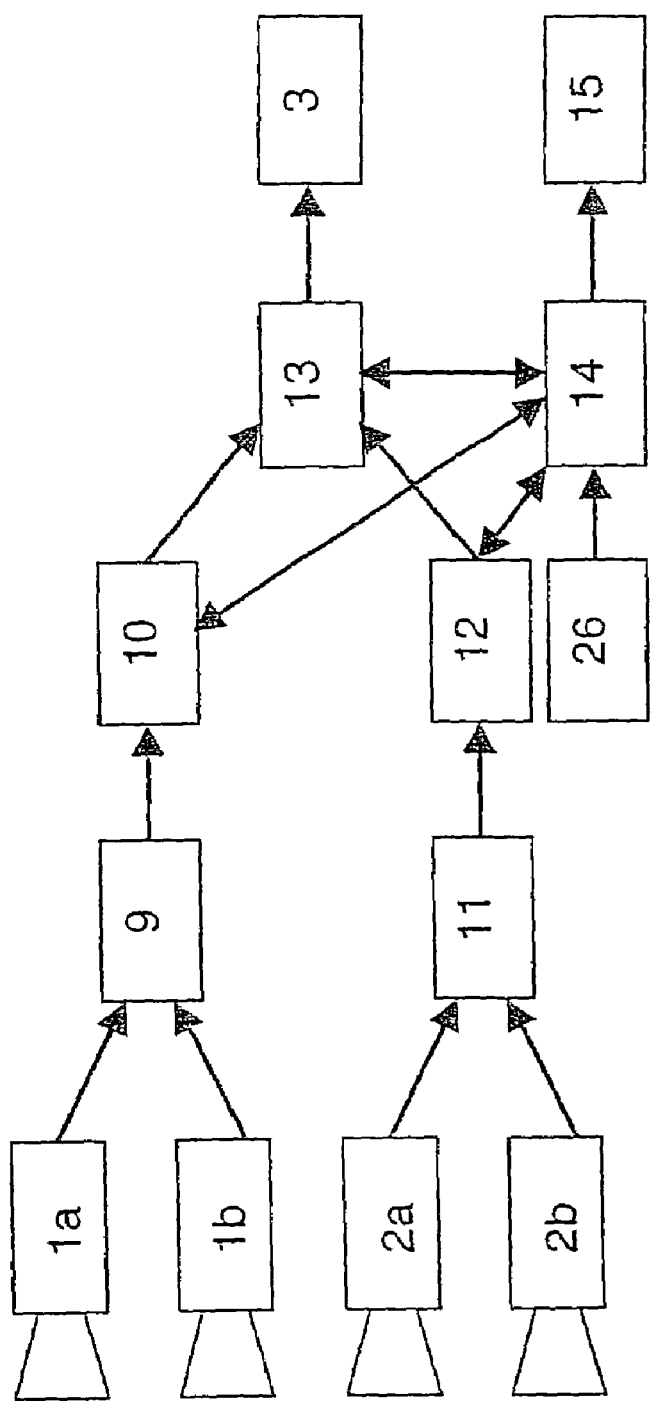
FIG. 5 shows a block diagram of a second exemplary embodiment of a head-up display system.

FIG. 5 shows a block diagram for the implementation of an exemplary embodiment of a head-up display system, according to the present invention. Elements of FIG. 5 which correspond to elements of FIGS. 2, 3 and 4 are marked using the same reference numerals.

The system of FIG. 5 includes recording sensors 1a and 1b for the space external to the vehicle. In addition, the system has further environment recording sensors of system 2 (cf. FIGS. 2 and 3), i.e. passenger compartment sensors 2a and 2b.

The data supplied by recording sensors 1a and 1b are processed by a computing and algorithm unit 9. Based on the processing in computer and algorithm unit 9, the data ascertained by recording sensors 1a and 1b are allocated to one or several patterns of the space external to the vehicle 7. In this connection, patterns for traffic signs (cf. FIG. 6), for preceding vehicles (cf. FIG. 7), for pedestrians (cf. FIG. 8) and/or for the course of the road or for other objects in the space external to the vehicle 7 may be involved. The data supplied by recording sensors 1a and 1b are allocated to one or more of the patterns, using pattern recognition. In this way, for example, traffic signs imaged by recording sensors 1a and 1b may be recognized in the space external to the vehicle and visualized in a correct-location manner. From this pattern recognition there results a model 10 of the external space.

The head-up display system also has passenger compartment sensors 2a and 2b for recording the vehicle's passenger compartment. The data supplied by passenger compartment sensors 2a and 2b are processed by a computing and algorithm unit 11. With the aid of pattern recognition, a model 12 of the vehicle's passenger compartment is generated by computing and algorithm unit 11, for example, with regard to the position of the driver's head and optionally of the front seat passenger's head.

The model of the vehicle's passenger compartment may, however, also include components which are able to be evaluated during additional method steps. For example, the model of the vehicle's passenger compartment may include the eye positions of one or more of the passengers, such as the driver and/or the front-seat passenger, as well as each respective viewing direction.

Models 10 and 12 of the space external to the vehicle and the vehicle's passenger compartment are made use of by a computing unit 13, in order to indicate driver-relevant data at correct-location positions via projection unit 3. The correct-location display of information from the environment of the vehicle takes place based on the processing of object positions in the vehicle's surroundings and the position of at least one of the passengers, for example, the position of the eyes of the driver.

Further evaluations with respect to models 10 and 12, information from calculating unit 13, data of additional vehicle sensors 26 with regard to the vehicle's environment as well as other sensors not shown in FIG. 5, which may supply data with respect to the operation of the vehicle itself, may be passed to an optional controller 14, which may be able to intervene in calculating unit 13 and which may output additional information and/or warnings via suitable output units 15, such as acoustical, visual and or haptic actuators.

Figure 6:
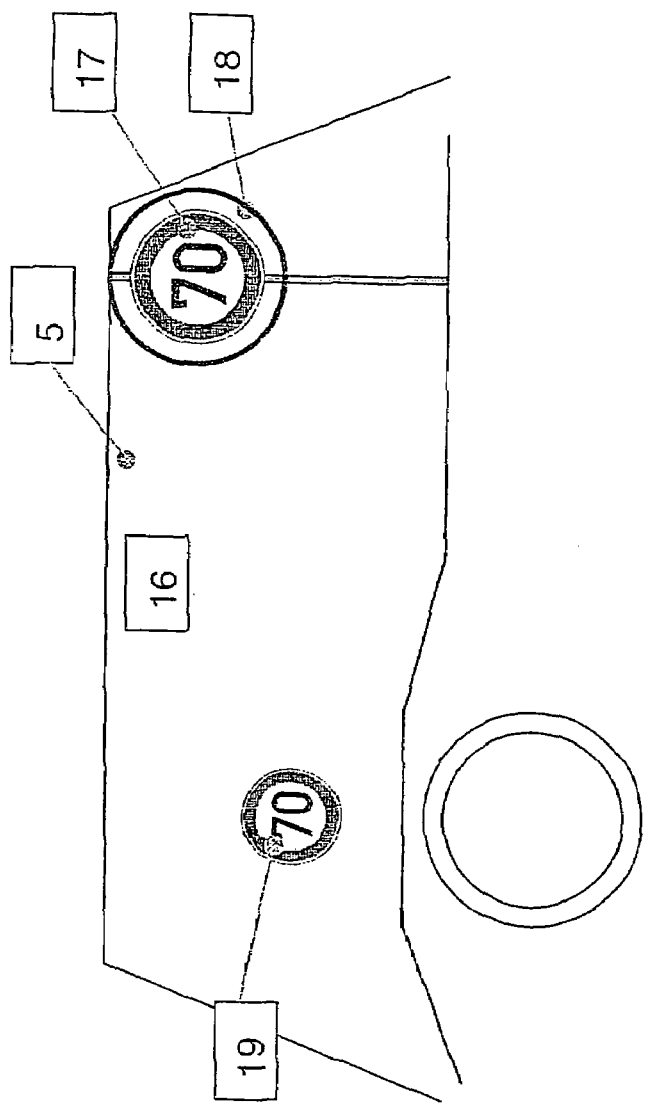
FIG. 6 shows a representation on a head-up display system as the vehicle driver sees it.

FIG. 6 shows an exemplary embodiment of the view of the driver through windshield 5 upon road scene 16. In road scene 16 there may be, for example, a traffic sign 17 which is detected by recording sensors 1. Giving consideration to the head position of the driver 4, projection unit 3 projects a correct-location marking 18 around the traffic sign onto windshield 5, in order to highlight the traffic sign.

Furthermore, the driver may have faded in for him on the head-up display an additional suitable warning into his direct viewing range. In the example shown, recognized traffic sign 17 is faded in once more as symbol 19. This may happen, perhaps, when the driver is not observing the speed limit.

Figure 7:
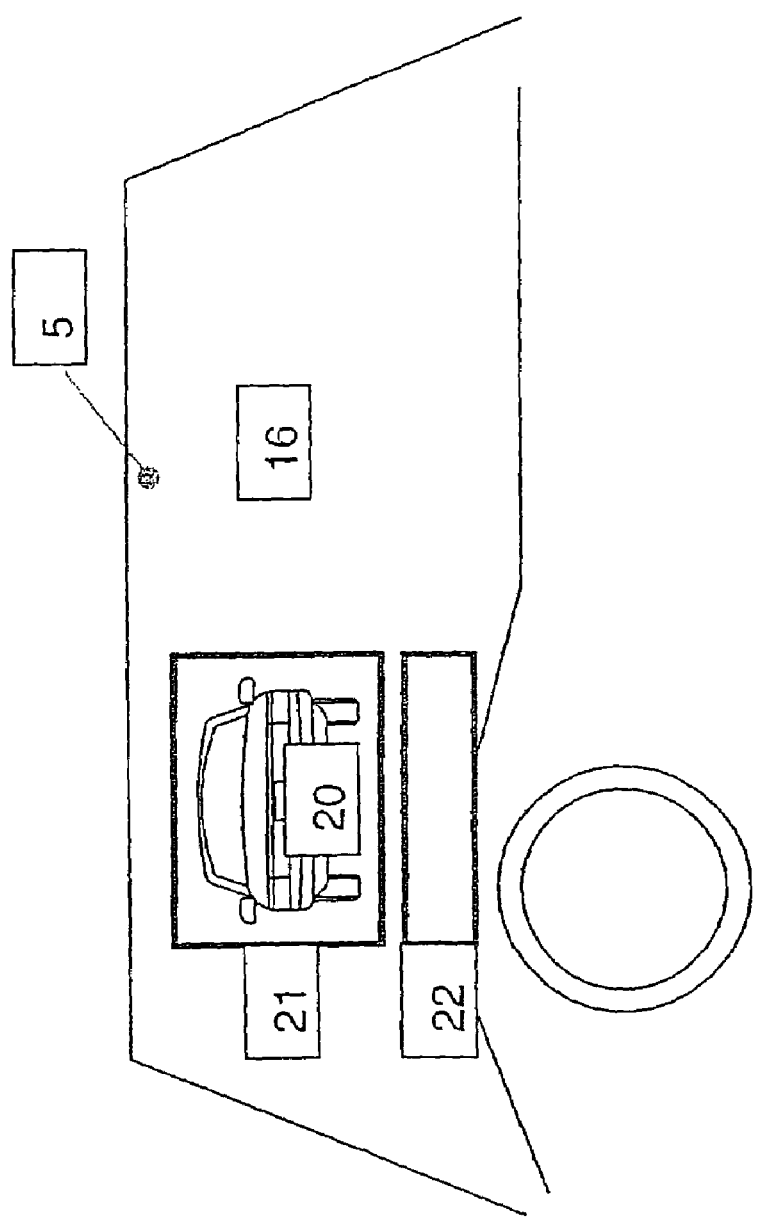
FIG. 7 shows another exemplary representation on a head-up display system as the vehicle driver sees it.

An additional exemplary embodiment of an application is shown by FIG. 7. Here, a vehicle 20, which is present within current road scene 16, is highlighted by a marking 21 in the projection of the head-up display. Additional information concerning preceding vehicle 20 may be displayed in a window 22, underneath vehicle 20, in the direct visual range of the driver. This may involve the distance from preceding vehicle 20 and/or the differential speed. Moreover, the driver may be able to select preceding vehicle 20 by the marking 21, so that it may be used as a reference object for an automatic cruise control system.

Figure 8:
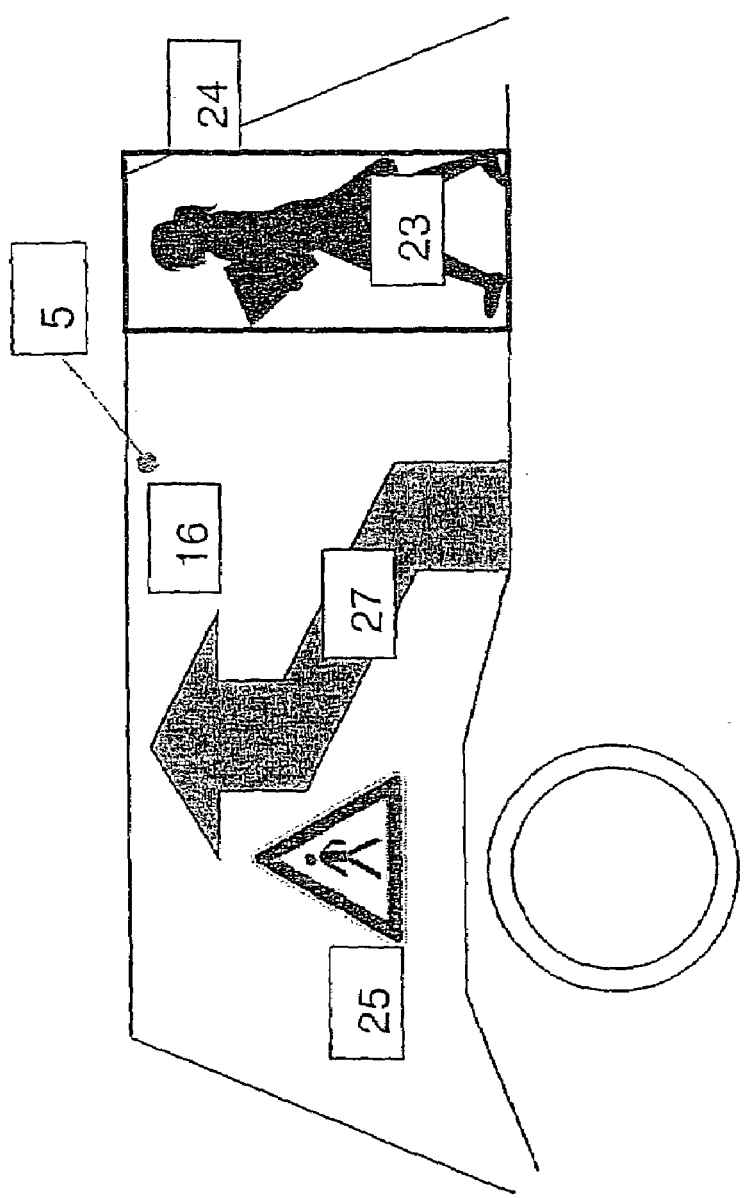
FIG. 8 shows another exemplary representation on a head-up display system as the vehicle driver sees it.

FIG. 8 shows another exemplary embodiment of the application situation, in which a pedestrian 23 in the current road scene enters, for example, from the right into the travel range of the vehicle. This may mean a serious endangerment of the pedestrian and also of the vehicle and the driver. In order, for example, to direct the attention of the driver to the pedestrian, a suitable warning is faded in, in the viewing range of the driver by a symbol 25, and pedestrian 23 is faded in by a correct-location representation via projection unit 3.

This may be necessary if pedestrian 23 is not detectable by the driver, or only very poorly, on account of the illumination conditions. In addition, a frame 24 may be faded in around pedestrian 23, in order to highlight him especially.

At the same time, via a symbol 27, a possible evasive maneuver may be blended in via projection unit 3 in head-up fashion. One or more alternative evasive maneuvers may also be faded in, using additional symbols. If the driver selects one of the evasive maneuvers offered, this one may then be automatically executed by the vehicle.

The reference numeral list is as follows:
recording sensors 1
system 2
projection unit 3 head position 4
windshield 5
recording range 6
vehicle 7
recording range 8
computing and algorithm unit 9
model 10
computing and algorithm unit 11
passenger compartment of the vehicle 12
calculating unit 13
controller 14
output 15
road scene 16
traffic sign 17
marking 18
symbol 19
vehicle 20
marking 21
window 22
pedestrian 23
frame 24
symbol 25
additional vehicle sensors 26
symbol 27

What is claimed is:

1. A head-up display system for representing an object in a space external to a vehicle, comprising:
a position system for recording a position of at least one of the passengers of the vehicle;
a projection unit for projecting a correct-location representation of the object, the correct-location representation including a marking configured to surround and be spaced apart from the actual object as seen by the at least one of the passengers of the vehicle, and for fading in a symbol into a direct viewing range of a driver of the vehicle in a location different than that of the projection of the correct-location representation, the symbol representing the object;
a sensing arrangement to sense the object in the space external to the vehicle; and
a computing unit for receiving sensed object data from the sensing arrangement and recognizing a pattern in the sensed object data to generate the symbol representing the object as a function of the sensed object data and symbol data stored in a databank,
wherein the computing unit can recognize patterns associated with traffic signs, pedestrians and vehicles to generate corresponding symbols.

2. The head-up display system of claim 1, wherein the sensing arrangement includes at least one of a video camera, a radar sensor, a lidar sensor, a range imager, a time-off flight sensor, a night vision sensor, and an infrared sensor.

3. The head-up display system of claim 1, wherein the sensing arrangement generates a multi-dimensional image of a region of the space exterior to the vehicle.

4. The head-up display system of claim 3, wherein the sensing arrangement includes stereo sensors.

5. The head-up display system of claim 1, wherein the position system records at least one of a head position and a position of the eyes of at least one of the driver and a front-seat passenger.

6. The head-up display system of claim 1, wherein the position system includes a sensor device having at least one of a video camera, a radar sensor, a lidar sensor, a range imager, a time-off flight sensor, a night vision sensor, and an infrared sensor for generating a multi-dimensional image of the passenger compartment of the vehicle.

7. The head-up display system of claim 1, further comprising:
a calculating unit for computing image data for the correct-location representation of the object based upon data supplied by the position system.

8. The head-up display system of claim 7, further comprising:
a highlighting device for highlighting the object in the correct-location representation.

9. The head-up display system of claim 8, wherein the object is at least one of a pedestrian, a cyclist, a traffic participant, a traffic sign, a traffic light, a priority highway, a pedestrian crosswalk, and a roadway marking.

10. The head-up display system of claim 1, further comprising:
additional vehicle sensors for generating at least one of a warning sign, a recommendation and danger information with regard to the object shown.

11. The head-up display system of claim 1, wherein the projection unit projects the correct-location representation of a warning as a function of a driving situation.

12. The head-up display system of claim 11, wherein the driving situation involves the vehicle leaving a roadway.

13. The head-up display system of claim 11, wherein the projection unit projects the correct-location representation of an assistance function as a function of the driving situation.

14. The head-up display system of claim 11, wherein the driving situation involves the vehicle making one of a lane change and a change to a turn-off lane.

15. The head-up display system of claim 1, wherein the projection unit projects the correct-location representation of an evasive maneuver around the object.

16. The head-up display system of claim 15, further comprising:
a computing and algorithm unit for determining the evasive maneuver.

17. The head-up display system of claim 1, wherein the projection unit fades in at least one of information and a warning if the head of at least one of the driver and the front-seat passenger is in an unfavorable position.

18. The head-up display system of claim 1, wherein the unfavorable position is unfavorable with respect to an air bag.

19. The head-up display system of claim 1, further comprising:
an automatic cruise control system, wherein the displayed object is selectable as a reference object for the automatic cruise control system.

20. The head-up display system of claim 1, further comprising:
a computer for determining a representation of the object by accessing data.

21. The head-up display system of claim 20, wherein the data is stored in a navigation databank of a navigation system.

22. The head-up display system of claim 1, wherein the data includes video data.

23. The head-up display system of claim 22, wherein the video data is transmitted by at least one of a television transmission, a DVD playback device, and an information service.

24. The head-up display system of claim 20, wherein the representation occurs when the vehicle travels below a maximum vehicle speed.

25. The head-up display system of claim 1, wherein the position system is configured to record at least one front-seat passenger position.

26. The head-up display system of claim 11, wherein the projection unit is configured to project the correct-location representation of the object with respect to the position of a front-seat passenger.

27. A navigation system comprising:
a head-up display system for representing an object in a space external to the vehicle, the head-up system including:
   a position system for determining a vehicle position, and for recording a position of at least one of the passengers of the vehicle;
   a projection unit for projecting a correct-location representation of the object, the correct-location representation including a marking configured to surround and be spaced apart from the actual object as seen by the at least one of the passengers of the vehicle, and for fading in a symbol into a direct viewing range of a driver of the vehicle in a location different than that of the projection of the correct-location representation, the symbol representing the object;
   a sensing arrangement to sense the object in the space external to the vehicle; and
   a computing unit for receiving sensed object data from the sensing arrangement and recognizing a pattern in the sensed object data to generate the symbol representing the object as a function of the sensed object data and symbol data stored in a databank,
   wherein the computing unit can recognize patterns associated with traffic signs, pedestrians and vehicles to generate corresponding symbols.

28. An automatic cruise control system, comprising:
a distance recorder for recording a distance from an object traveling ahead;
a head-up display system for representing an object in a space external to the vehicle, wherein the object traveling ahead is used as reference point for use in automatic cruise control, and the object traveling ahead is represented in a correct-location manner by the head-up display system, the head-up display system including:
   a position system for recording a position of at least one of the passengers of the vehicle;
   a projection unit for projecting a correct-location representation of the object, the correct-location representation including a marking configured to surround and be spaced apart from the actual object as seen by the at least one of the passengers of the vehicle, and for fading in a symbol into a direct viewing range of a driver of the vehicle in a location different than that of the projection of the correct-location representation, the symbol representing the object;
   a sensing arrangement to sense the object in the space external to the vehicle; and
   a computing unit for receiving sensed object data from the sensing arrangement and recognizing a pattern in the sensed object data to generate the symbol representing the object as a function of the recorded object data and symbol data stored in a databank,
   wherein the computing unit can recognize patterns associated with traffic signs, pedestrians and vehicles to generate corresponding symbols.

29. The automatic cruise control system of claim 28, wherein the object represented in a correct-location manner is selected as a reference object.

30. A method for providing a correct-location head-up representation of an object in a space external to a vehicle on a windshield, the method comprising:
recording a position of at least one of a driver and a front-seat passenger;
determining image data for the correct-location representation of the object with respect to the position; and
providing as a head-up projection the correct-location representation of the image data, the correct-location representation including a marking configured to surround and be spaced apart from the actual object as seen by the at least one of the driver and the front-seat passenger, and fading in a symbol into a direct viewing range of the driver of the vehicle in a location different than that of the projection of the correct-location representation, the symbol representing the object;
sensing the object in the space external to the vehicle; and
recognizing a pattern in sensed object data to generate the symbol representing the object as a function of the sensed object data and symbol data stored in a databank,
wherein the recognizing includes recognizing patterns associated with traffic signs, pedestrians and vehicles to generate corresponding symbols.

31. The method of claim 30, wherein a position of the eyes of at least one of the driver and the front-seat passenger is recorded.

32. The method of claim 30, wherein at least one sensor in the space external to the vehicle is used to determine the image data.

33. The method of claim 30, further comprising:
providing the sensed object data to an evaluation unit; and
providing at least one of information, a warning and a correct-location marking in a head-up projection based on a determination by the evaluation unit.

34. The method of claim 30, further comprising:
accessing at least one of a databank and a data file for providing the correct-location representation of the object.

35. The method of claim 34, wherein the databank includes a navigation databank.

36. The method of claim 34, wherein the data includes video data.

37. The method of claim 36, further comprising:
transmitting the video data by at least one of a television transmission, a DVD playback device, and an information service.

38. A computer program product on one of a computer-readable medium and a data file transmittable via a computer network, the computer program product being executable on an electronic system, comprising:
programming arrangement for performing a process for providing a correct-location head-up representation of an object in a space external to a vehicle on a windshield, the process including:
   recording a position of at least one of a driver and a front-seat passenger;
   determining image data for the correct-location representation of the object with respect to the position; and
   providing as a head-up projection the correct-location representation of the image data, the correct-location representation including a marking configured to surround and be spaced apart from the actual object as seen by the at least one of the driver and the front-seat passenger, and fading in a symbol into a direct viewing range of the driver of the vehicle in a location different than that of the projection of the correct-location representation, the symbol representing the object;

sensing the object in the space external to the vehicle using a sensing arrangement of the vehicle, wherein the sensing arrangement includes at least one of: a video camera, a radar sensor, a lidar sensor, a range imager, a time-off flight sensor, a night vision sensor, or an infrared sensor; and recognizing a pattern in sensed object data to generate the symbol representing the object as a function of the sensed object data and symbol data stored in a databank, wherein the recognizing includes recognizing patterns associated with traffic signs, pedestrians and vehicles to generate corresponding symbols.

39. The computer program product of claim 38, wherein the electronic system includes one of a head-up display system, a navigation system, and a system for automatic cruise control.

* * * * *

UNITED STATES PATENT AND TRADEMARK OFFICE
CERTIFICATE OF CORRECTION

PATENT NO. : 7,605,773 B2 Page 1 of 1
APPLICATION NO. : 10/481912
DATED : October 20, 2009
INVENTOR(S) : Holger Janssen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1380 days.

Signed and Sealed this

Fifth Day of October, 2010

David J. Kappos
*Director of the United States Patent and Trademark Office*